US008763137B2

(12) United States Patent
Shigeeda et al.

(10) Patent No.: US 8,763,137 B2
(45) Date of Patent: Jun. 24, 2014

(54) AUTHORITY MANAGEMENT APPARATUS AUTHORITY MANAGEMENT SYSTEM AND AUTHORITY MANAGEMENT METHOD

(75) Inventors: Nobuyuki Shigeeda, Kawasaki (JP); Naohiro Taguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1399 days.

(21) Appl. No.: 11/779,160

(22) Filed: Jul. 17, 2007

(65) Prior Publication Data

US 2008/0028449 A1 Jan. 31, 2008

(30) Foreign Application Priority Data

Jul. 28, 2006 (JP) ................................. 2006-206981
May 18, 2007 (JP) ................................. 2007-133406

(51) Int. Cl.
*G06F 7/04* (2006.01)
(52) U.S. Cl.
USPC .................. 726/26; 726/27; 726/28; 713/182
(58) Field of Classification Search
CPC ................................................ H04L 2209/603
USPC .................. 726/26, 27, 28; 713/182
See application file for complete search history.

(56) References Cited

U.S. PATENT DOCUMENTS

| 7,249,107 B2* | 7/2007 | Yaacovi | 705/59 |
| 2002/0116420 A1* | 8/2002 | Allam et al. | 707/526 |
| 2003/0028622 A1* | 2/2003 | Inoue et al. | 709/219 |
| 2005/0134894 A1* | 6/2005 | Littman et al. | 358/1.14 |

FOREIGN PATENT DOCUMENTS

| CN | 1636177 | 7/2005 |
| JP | 2004-046366 A | 2/2004 |
| JP | 2004-166241 A | 6/2004 |
| JP | 2006-119719 A | 5/2006 |

* cited by examiner

*Primary Examiner* — Christopher Brown
(74) *Attorney, Agent, or Firm* — Canon USA, Inc., I.P. Division

(57) ABSTRACT

An authority management apparatus configured to communicate with an external apparatus having one or more functions includes a management unit configured to manage authority information indicating an authority concerning use of the one or more functions of the external apparatus with respect to a particular user, an updating unit configured to, based on permission information for permitting a second user different from a first user to use a function of the external apparatus that the first user can execute, update the authority information concerning the second user, and a sending unit configured to send the authority information updated by the updating unit to the external apparatus to be used by the second user.

11 Claims, 10 Drawing Sheets

FIG.7

```
FROM      : PrivilegeMappingSrv@example.com
TO        : userb@example.com
SUBJECT   : UPDATE OF AUTHORITY TRANSFER INFORMATION

AUTHORITY WAS TRANSFERRED FROM USER A UNDER
THE FOLLOWING CONDITIONS.

PROCESSING CONTENT  : PRINT
DEVICE ID           : 1001
BOX ID              : 044
DATA ID             : 101004
EXPIRATION DATE     : 2005/11/08
```

FIG.10

```
<?xml versoin="1.0" encoding="UTF-8" ?>
<ACT>
   <Username>Bob</Username>
   <FunctionList>
      <Function>SEND</Function>
      <Function>PRINT</Function>
   </FunctonList>
   <BoxList>
      <Box DevID="1003" Access="Full" />
      <Box DevID="1001" ID="044" Access="Read" />
   </BoxList>
</ACT>
```

AUTHORITY MANAGEMENT APPARATUS AUTHORITY MANAGEMENT SYSTEM AND AUTHORITY MANAGEMENT METHOD

BACKGROUND OF THE INVENTION

1. Field of the Invention

The present invention relates to an authority management apparatus, an authority management system, and an authority management method.

2. Description of the Related Art

In a business scene, an upper management person often requests a subordinate worker or his secretary to perform processing, such as copying, printing, and facsimile transmission, in substitution for him.

In this regard, in order to perform such substitute processing with a system that centrally manages an authority to access an office appliance, such as an image forming apparatus (i.e., a printer and a digital multifunction peripheral (MFP)), it is necessary that the person requested to perform the substitute processing temporarily perform the substitute processing on an authority of the requesting person.

Focusing on substitution of print processing, typically, a requesting person previously performs hold printing (hold job) and notifies a password for resuming the held processing to a requestee. In hold printing, when an image forming apparatus receives print data from an external apparatus, the image forming apparatus does not immediately print the received print data. The image forming apparatus stores the received print data in a storage device included therein. When a user generates an instruction for printing the stored print data, the image forming apparatus prints the stored print data. A password is associated with print data. The image forming apparatus prints the stored print data only when a correct password is input together with the print instruction.

In addition, focusing on performing processing on other person's authority higher than the authority of a requestee, Japanese Patent Application Laid-Open No. 2004-166241 discusses a method for controlling processing with a security policy describing a rule for handling a document.

Typically in hold printing, even if a requester loses the authority to access the requested job, for example due to a change in office or retirement after having requested a print job to a requestee, the requestee can resume the requested print job as long as the requestee has already received the password to the job. That is, an access right cannot be always managed in the above-described case although access rights are centrally managed.

Furthermore, Japanese Patent Application Laid-Open No. 2004-166241 discusses a method using pull printing, in which data to be processed and processing conditions for the data are stored. With this method, once a security policy or a processing condition is set for data to be processed, a change in setting of an access right cannot be reflected in processing the data.

In either of the above-described cases, if a requester loses an authority after completing an operation for substitute processing, a requestee can perform the substitute processing, which may cause distribution of confidential information.

SUMMARY OF THE INVENTION

The present invention is directed to an authority management apparatus and an authority management system capable of reducing risk of distribution of data by a person performing substitute processing.

According to an aspect of the present invention, an authority management apparatus configured to communicate with an external apparatus having one or more functions includes a management unit configured to manage authority information indicating an authority concerning use of the one or more functions of the external apparatus with respect to a particular user, an updating unit configured to, based on permission information for permitting a second user different from a first user to use a function of the external apparatus that the first user can execute, update the authority information concerning the second user, and a sending unit configured to send the authority information updated by the updating unit to the external apparatus to be used by the second user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 7 illustrates an example of text of a message used in notifying details of the association information to an authority transfer destination principal when the association information is updated, according to an exemplary embodiment of the present invention.

FIG. 10 illustrates an example of authority information about an arbitrary user principal according to an exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

In the following description, a term "principal" collectively refers to a user using the system according to exemplary embodiments of the present invention and a group (division) of arbitrarily sectionalized users.

Figure 1:
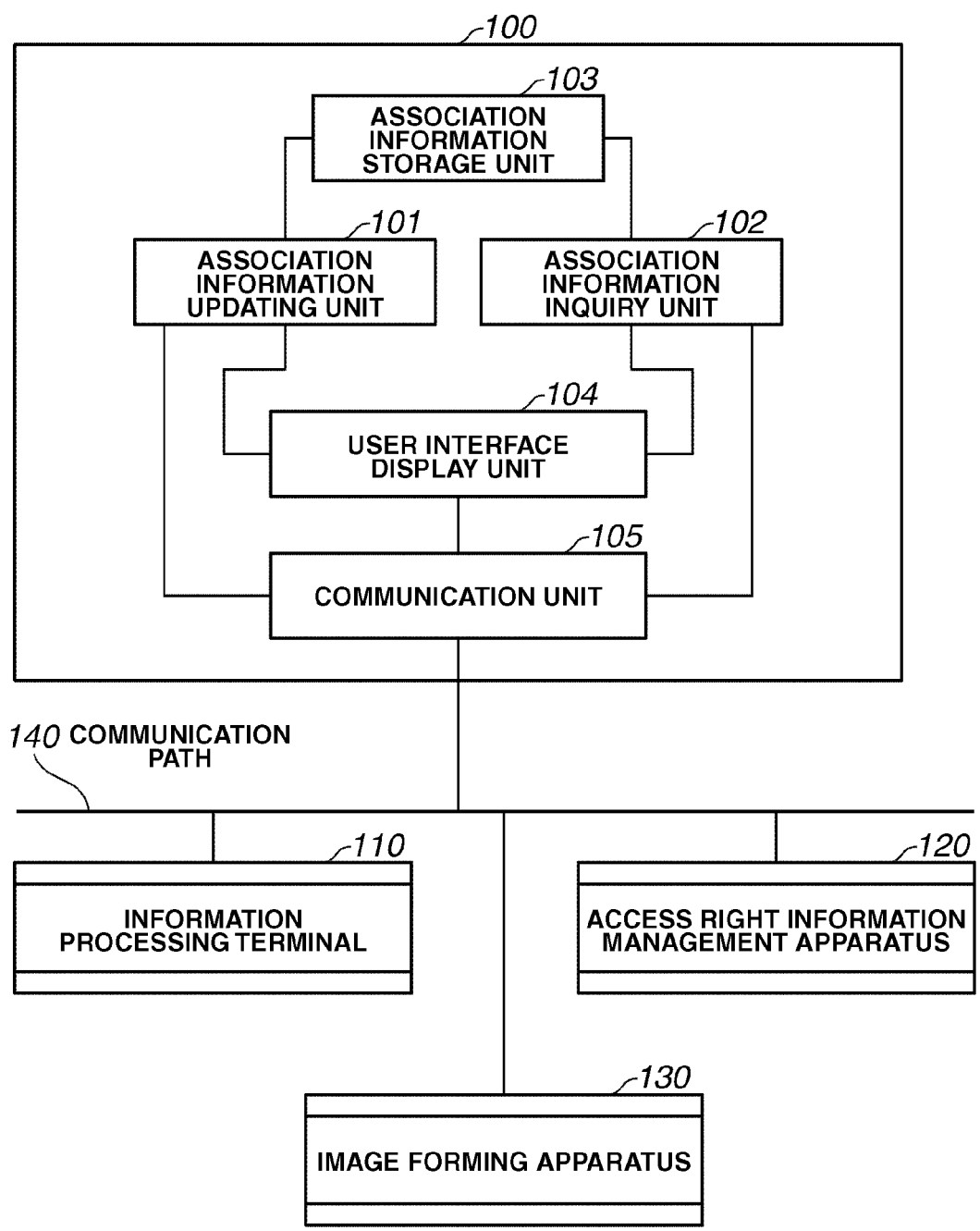
FIG. 1 illustrates an exemplary configuration of an information processing system according to an exemplary embodiment of the present invention.

FIG. 1 illustrates an exemplary configuration of an information processing system according to an exemplary embodiment of the present invention. The information processing system illustrated in FIG. 1 includes a mapping information management apparatus 100, an information processing terminal 110, an image forming apparatus 130, and an access right information management apparatus 120, which are in communication with one another via a communication path 140.

A plurality of information processing terminals 110 and image forming apparatuses 130 can be connected to the communication path 140. The information processing terminal 110 is mainly assumed to be regularly used by a user to perform an arbitrary operation.

The image forming apparatus 130 can be an MFP having a plurality of functions, such as a copy function, a print function, an image communication function, and a storage function, and an apparatus having a single function, such as a printer or a facsimile apparatus. The access right information management apparatus 120 centrally manages access right information concerning use of the image forming apparatus 130 with respect to each principal.

In using the image forming apparatus 130, a user previously registers himself as a user principal on the access right information management apparatus 120 to provide the principal with an authority to use the image forming apparatus 130. In the present embodiment, an authority can be provided to the user principal or to a group principal to which the user principal belongs.

An access right is controlled as described below according to the authority to use the image forming apparatus 130 provided as described above. First, the user enters an identification (ID) for identifying a principal on the image forming apparatus 130. The image forming apparatus 130 identifies a principal according to the entered ID. In the present exemplary embodiment, a general user authentication method can be used.

Then, the image forming apparatus 130 sends information for identifying the principal to the access right information management apparatus 120. The access right information management apparatus 120 generates information for controlling the image forming apparatus 130 according to the previously registered use authority information for the principal based on the information received from the image forming apparatus 130. The control information generated can be, for example, data having a structure illustrated in FIG. 10.

FIG. 10 illustrates an example of authority information concerning a specific user principal. Referring to FIG. 10, a user principal using the image forming apparatus 130 can be uniquely identified according to an element "<Username>".

In addition, an authority to use the functions of the image forming apparatus 130 that the user principal can use and an authority to access a BOX (a storage area in a storage device of the image forming apparatus 130) are described below the element "<Username>". In the example illustrated in FIG. 10, a user identified as "Bob" is provided with authorities to use a "SEND" function, a "PRINT" function, and a "BOX" function of the image forming apparatus 130.

The user named "Bob" has a full access (unrestricted access) to a BOX identified with a BOX device ID "1003". With respect to a box identified with a BOX device ID "1001" and an ID "044", the user "Bob" has an authority to read only. The BOX function utilizing a BOX will be described below.

The image forming apparatus 130 interprets the control information generated by the access right information management apparatus 120 and controls the processing requested by the user according to the control information.

In the present embodiment, objects of authority transfer, which will be described below, include an authority to use a function that is described as an element "<Function>" in FIG. 10 and an authority to access data stored in a BOX described as an element "<BOX>" in FIG. 10.

In the present embodiment, the authority information described in the control information includes information about an authority to use the functions of the image forming apparatus 130 and an access right to the data stored in a BOX. However, any authority information can be used as long as the information can be managed by the access right information management apparatus 120. Furthermore, different information equivalent to the above-described authority information can be used.

In this case, it is necessary to modify an authority information schema illustrated in FIG. 10 so that the different information is included in the authority information. The control information illustrated in FIG. 10 is also referred to as an "access control ticket" (ACT).

The mapping information management apparatus 100 can be implemented by hardware, or can be implemented by software on a general information processing apparatus, such as a personal computer (PC) or a server computer, as will be described below with reference to FIG. 2.

Furthermore, in the case where the mapping information management apparatus 100 is to be implemented by hardware, the mapping information management apparatus 100 can be implemented by hardware including a single apparatus or by hardware including a plurality of arbitrary apparatuses operating on single hardware. For example, the mapping information management apparatus 100 and the access right information management apparatus 120 can be integrated in the same server apparatus.

The mapping information management apparatus 100 includes an association information updating unit 101, an association information inquiry unit 102, an association information storage unit 103, a user interface display unit 104, and a communication unit 105.

The association information updating unit 101 updates information for mutually associating an authority transfer source principal, an authority transfer destination principal, and processing that is an object of authority transfer, according to a user operation via the information processing terminal 110 and a user interface of the mapping information management apparatus 100 itself.

The mapping information management apparatus 100 enables transfer of at least one part of an authority of a specific principal, of authority information managed by the access right information management apparatus 120, to another principal.

That is, the association information managed by the mapping information management apparatus 100 permits another principal to use the function of the image forming apparatus 130 that can be used by a specific principal.

In the authority transfer according to the present embodiment, in one case, no access right remains for an authority transfer source principal after an access right of the authority transfer source principal is transferred to an authority transfer destination principal. In another case, an access right remains for an authority transfer source principal after an access right of the authority transfer source principal is transferred to an authority transfer destination principal.

At the time when the access right information management apparatus 120 generates control information for the image forming apparatus 130, the association information inquiry unit 102 generates an inquiry as to association information according to a request from the access right information management apparatus 120. The "association information" refers to information about an authority to be transferred to an authority transfer destination principal from an authority transfer source principal. The "association information" will be described in detail below.

After the inquiry has been issued, the access right information management apparatus 120 updates the use control information of an authority transfer destination principal with the use control information of an authority transfer source principal. Then, the access right information management apparatus 120 generates control information for the image forming apparatus 130 with respect to the authority transfer destination principal.

Thus, the access right information management apparatus 120 can generate dynamic and appropriate information for controlling the image forming apparatus 130 without rewriting the use control information with respect to principals that the access right information management apparatus 120 manages.

The association information storage unit 103 stores association information. The user interface display unit 104 functions as a user interface of the association information updating unit 101 and the association information inquiry unit 102. The communication unit 105 enables communication with the information processing terminal 110 and the access right information management apparatus 120.

The exemplary structure of the mapping information management apparatus 100 illustrated in FIG. 1 can be implemented by hardware, such as application specific integrated circuits (ASIC) or an field programmable gate array (FPGA). Furthermore, the exemplary structure of the mapping information management apparatus 100 illustrated in FIG. 1 can be implemented by a combination of a general personal computer and software.

Figure 2:
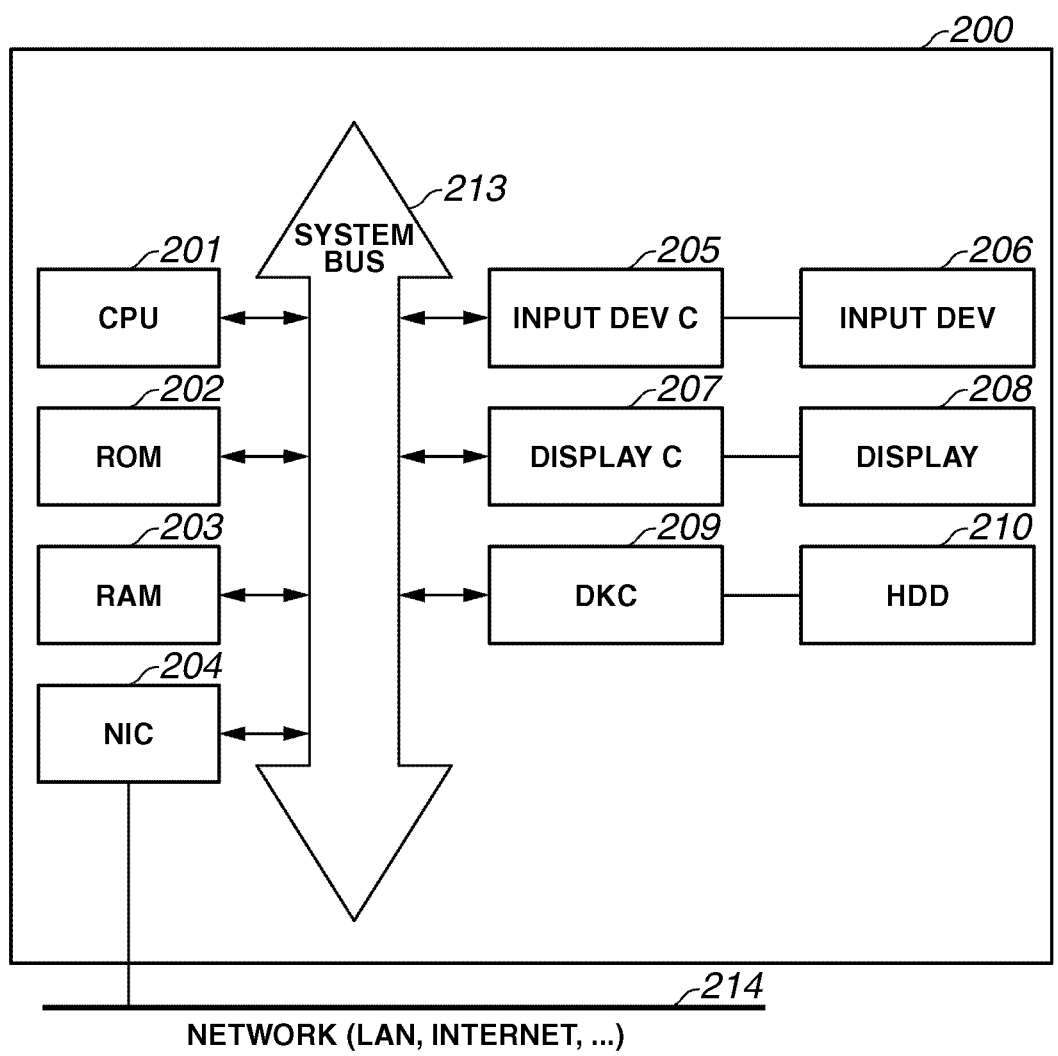
FIG. 2 illustrates an exemplary hardware configuration of a general information processing apparatus that can implement a mapping information management apparatus according to an exemplary embodiment of the present invention.

FIG. 2 illustrates an exemplary hardware configuration of a general information processing apparatus that can implement the mapping information management apparatus 100.

Referring to FIG. 2, an information processing apparatus 200 includes a central processing unit (CPU) 201. The CPU 201 executes software stored on a read-only memory (ROM) 202 or a hard disk drive (HDD) 210. The CPU 201 controls devices that are in communication with one another via a system bus 213.

The HDD 210 is also used as an area for storing association information. A random access memory (RAM) 203 is used as a main memory and a work area for the CPU 201. An external input controller ("Input Dev C" in FIG. 2) 205 controls input of an instruction via an input unit ("Input Dev" in FIG. 2) 206, which includes a keyboard and a mouse of the information processing apparatus 200. A display controller ("Display C" in FIG. 2) 207 controls a display on a display module ("Display" in FIG. 2) 208, which includes a liquid crystal display. A disk controller ("DKC" in FIG. 2) 209 controls the HDD 210.

A network interface card (NIC) 204 performs interactive data communication with another network device and a file server via a network 214 (equivalent to the communication path 140 in FIG. 1). Data transmitted during processing for updating the association information and processing for inquiring about the association information can be transmitted via the NIC 204.

The HDD 210 can be used as a temporary storage area for information being processed. The information processing terminal 110 also has a hardware configuration such as the one illustrated in FIG. 2.

Figure 9:
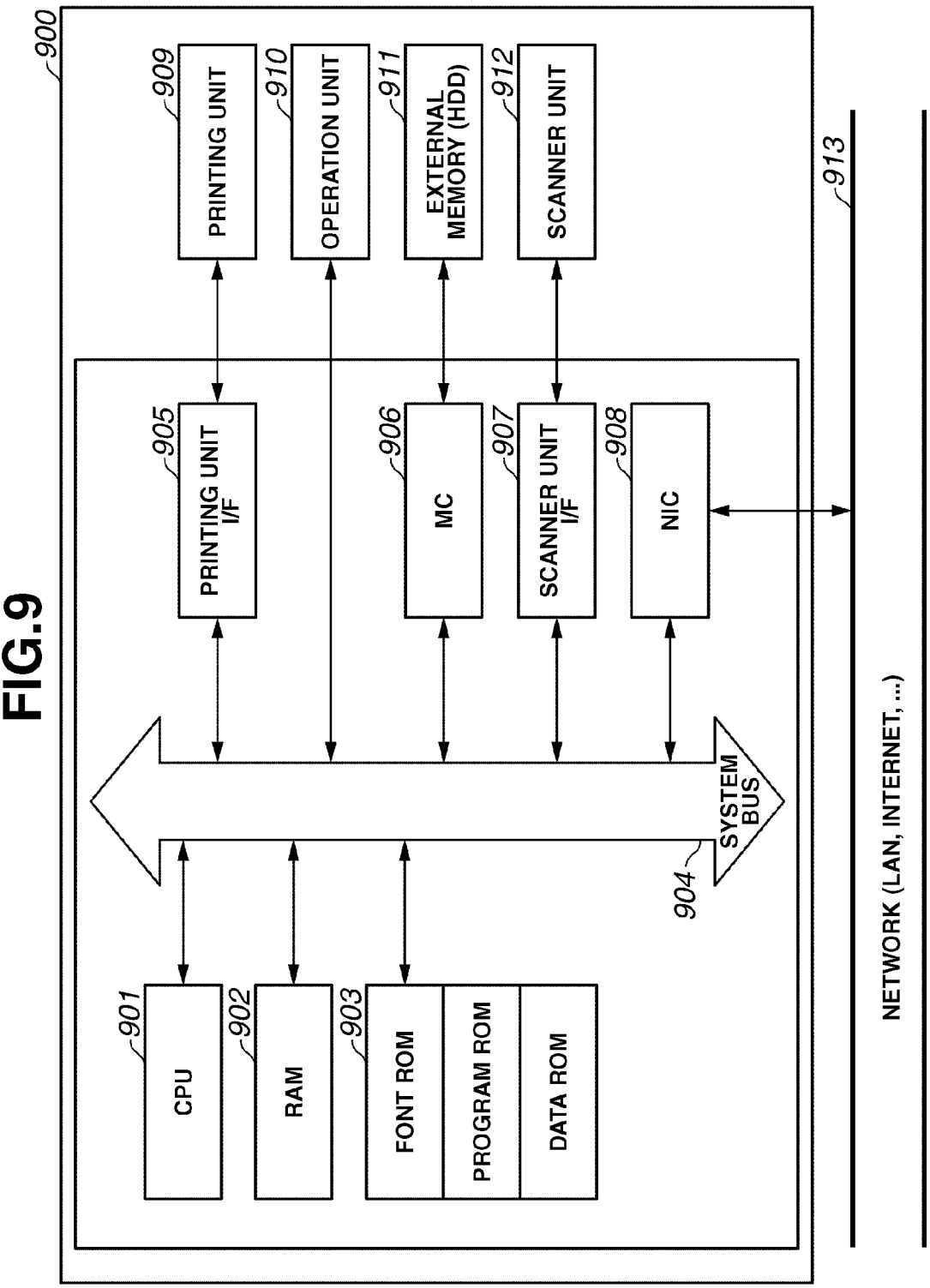
FIG. 9 illustrates an exemplary hardware configuration of an image forming apparatus according to an exemplary embodiment of the present invention.

An exemplary configuration of the image forming apparatus 130 (FIG. 1) will now be described with reference to FIG. 9. Referring to FIG. 9, an image forming apparatus 900 includes a CPU 901. The CPU 901 executes software stored in a ROM 903 or an external memory 911. The CPU 901 controls blocks that are in communication with one another via a system bus 904.

An image signal generated by the CPU 901 is output to a printing unit (image forming engine) 909 via a printing unit interface (I/F) 905. A RAM 902 is used as a main memory and a work area for the CPU 901. An access to the external memory 911 is controlled by a memory controller (MC) 906. The external memory 911 stores, among other things, font data, an emulation program, and image data.

An operation unit 910 includes an operation switch and a light emitting diode (LED) display device. A scanner unit I/F 907 corrects, processes, and edits image data received from a scanner unit 912. When the user generates an instruction for starting reading an image of a document with the operation unit 910, a document reading instruction is sent to the scanner unit 912.

An NIC 908 performs interactive data communication with another network device and a file server via a network 913 (equivalent to the communication path 140 in FIG. 1). Print image data and information for controlling use of the image forming apparatus 130 can be transmitted via the NIC 908. The external memory 911 can be used as a temporary storage area for information being processed.

The CPU 901 regulates traffic of data transmitted via the system bus 904. The CPU 901 controls a data flow path as described below according to usage of the image forming apparatus 900.

Copy function: the operation unit 910→the scanner unit 912→the scanner unit I/F 907→the printing unit I/F 905→the printing unit 909.

Network printing function: the NIC 908→the printing unit I/F 905→the printing unit 909.

Send function: the operation unit 910→the scanner unit 912→the scanner unit I/F 907→the NIC 908.

In the case where image data stored in the external memory 911 is used instead of a scan image, the scan processing operations (the scanner unit 912→the scanner unit I/F 907) are replaced with image data reading operations (the external memory 911→the MC 906).

In the case where image data is stored in the external memory 911 instead of performing print processing, the print processing operations (the printing unit I/F 905→the printing unit 909) are replaced with image data storage operations (the MC 906→the external memory 911). The above-described function for reading and storing image data is herein referred to as a "BOX function".

The functions of the image forming apparatus 130, such as the copy function, the network printing function, and the send function, can be controlled as permission or inhibition of their execution according to the above-described use control information. The control of access to image data in the above-described BOX function (i.e., permission and inhibition of reading and storing image data) can be performed according to the use control information.

Figure 3:
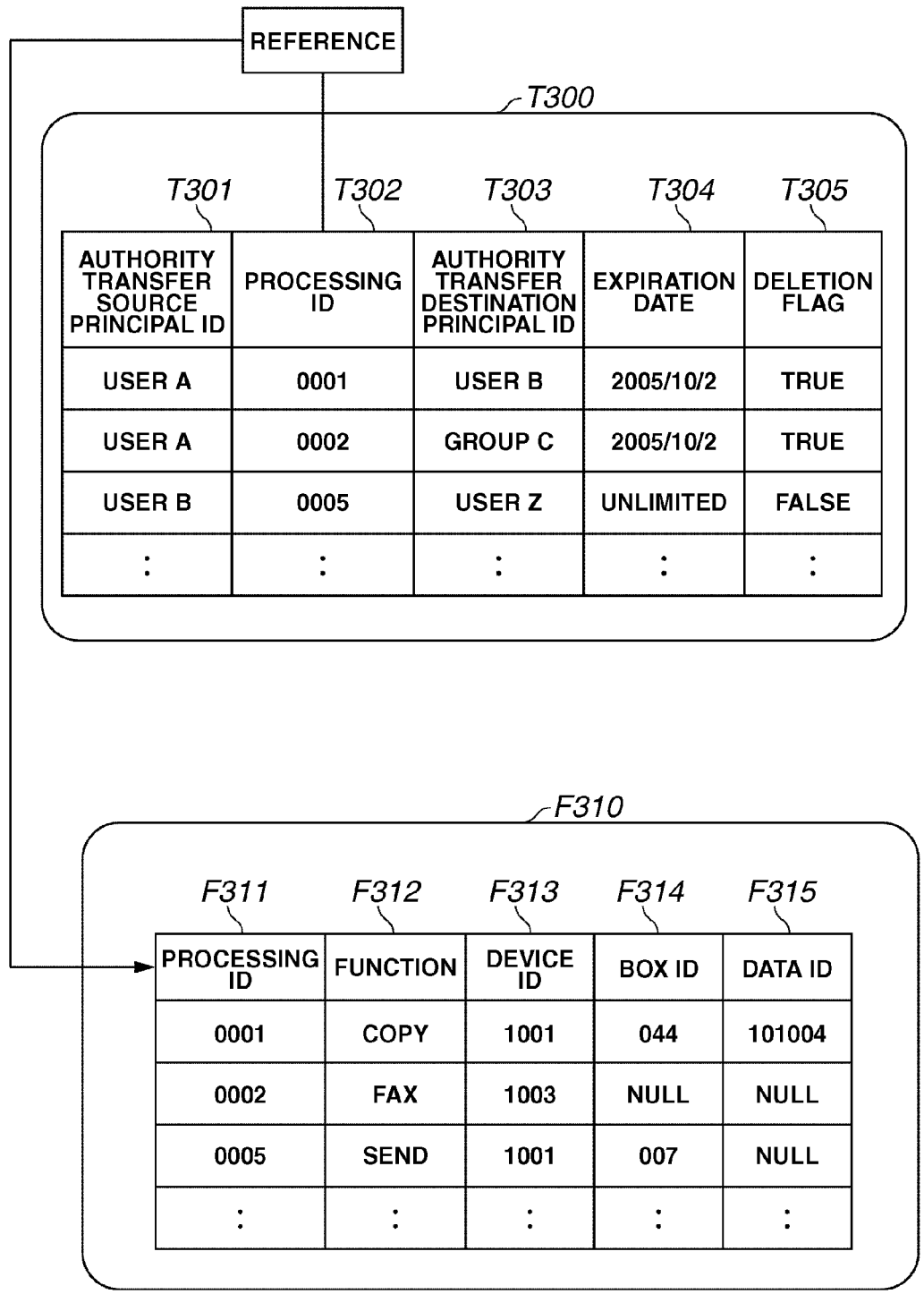
FIG. 3 illustrates an example of association information stored in an association information storage unit illustrated in FIG. 1 according to an exemplary embodiment of the present invention.

FIG. 3 illustrates an example of a form of storage of the association information stored in the association information storage unit 103 illustrated in FIG. 1. It is assumed that information is managed with a relational database in a database management system (DBMS).

In the present embodiment, the relational database can be stored in the HDD 210 illustrated in FIG. 2. Alternatively, the relational database can be stored on an apparatus that can communicate with the mapping information management apparatus 100 (FIG. 1) existing on the communication path 140 (FIG. 1).

In the present embodiment, as illustrated in FIG. 3, a database schema for managing association information includes a table T300 and a table F310. The table T300 manages a principal portion of the association information. The table F310 is generated by normalizing information about processing performed by the image forming apparatus 130. The table F310 is subordinate to the table T300.

The table T300 will be described below. An authority transfer source principal ID T301 is an item storing an identifier with which an authority transfer source principal can be uniquely identified.

Here, it is necessary that the data stored in this item, namely, an authority transfer source principal ID, is identical to the identifier used as an authority transfer source principal ID in the access right information management apparatus 120 illustrated in FIG. 1.

A processing ID T302 is an item storing a processing ID for uniquely identifying a content of processing by the image forming apparatus 130. The content of processing by the image forming apparatus 130 is managed by the table F310. The table F310 will be described in detail below.

An authority transfer destination principal ID T303 is an item storing an identifier that enables uniquely identifying an authority transfer destination principal designated with the authority transfer source principal ID T301.

As in the case of the authority transfer source principal ID T301, it is necessary that the data stored in the authority transfer destination principal ID field T303 be identical to the identifier used in the access right information management apparatus 120 illustrated in FIG. 1.

An expiration date T304 is an item storing a date until which the authority transfer is valid. In the case where no expiration date is provided (that is, in the case where the authority is semipermanently transferred), a symbol or a word indicating so ("unlimited" in FIG. 3) or a null value is stored.

After the lapse of the expiration date, the mapping information management apparatus 100 automatically deletes the association information. Setting an appropriate expiration date facilitates inhibiting the authority transfer destination principal from performing the requested processing without limitation.

By providing an expiration date as described above, the security in the case of requesting another person to perform processing using the image forming apparatus 130 can be improved.

In the case where a record for the authority transfer is to be nullified upon lapse of the expiration date T304 or by performing information updating processing requested from the association information updating unit 101 (FIG. 1), a deletion flag T305 enables detecting whether the record is still valid or invalid. That is, the deletion flag T305 is an item to be used for so-called "undeleting". As described above, in the present embodiment, in nullifying a record, the record is not deleted from the actual table. However, a specific record can be deleted.

The contents described in the above-described items can be mutually combined under a condition conforming to an operation policy, such as whether an authority can be transferred to a plurality of principals at the same time or on the contrary, whether authorities can be transferred from a plurality of principals. The combined contents can be uniquely restricted.

That is, it is useful to combine the authority transfer source principal ID T301 and the processing ID T302, or to combine the processing ID T302 and the authority transfer destination principal ID T303, under a condition conforming to the operation policy. Furthermore, it is useful to perform a setting as to whether an authority of an authority transfer source principal can be nullified in transferring the authority, under a condition conforming to the operation policy.

The table F310 will now be described. A processing ID F311 is an item storing an identifier with which a content of processing performed by the image forming apparatus 130 can be uniquely identified. In the present embodiment, the processing ID F311 is assumed to function as a primary key of the table F310.

As illustrated in FIG. 3, the processing ID F311 is defined with reference to the processing ID T302 in the table T300. Thus, the integrity between the table T300 and the table F310 can be maintained.

In generating a processing ID, a non-overlapping sequence number provided by the DBMS can be utilized. Alternatively, a processing ID can be generated, for example, by an operation of the CPU 201 according to a program previously stored in the ROM 202 or the HDD 210.

A function F312 is an item storing a value with which a function provided by the image forming apparatus 130 can be identified.

In the present embodiment, a function identifier is represented with a character string. However, a function identifier can be represented with a numerical value or a symbol indicating the value. In the present embodiment, function names such as "COPY", "FAX", and "SEND" are used.

A device ID F313 is an item storing an identifier with which the image forming apparatus 130 can be uniquely identified. The device ID F313 indicates, for example, a model number individually assigned to the image forming apparatus 130.

Furthermore, information for uniquely identifying the image forming apparatus 130 on the communication path 140, namely, an Internet protocol (IP) address or a media access control (MAC) address, can be used as the device ID F313.

The image forming apparatus 130 includes a storage area (namely, a "BOX") that can store image data. A plurality of BOXes is provided in a storage area (the external memory 911) of the image forming apparatus 130. Each of the BOXes is identified with a unique ID within the image forming apparatus 130 and a related system.

A BOX ID F314 in the table F310 is an item storing a unique ID with which the BOX can be uniquely identified. The BOX ID F314 is assumed to be used in combination with the device ID F313 to uniquely identify a storage area of an arbitrary image processing apparatus 130. A plurality of data can be stored in one BOX.

A data ID F315 is an item storing an identifier with which image data stored in a storage area indicated by the device ID F313 and the BOX ID F314 can be uniquely identified.

As a user enters a specific value in each of the function F312, the device ID F313, the BOX ID F314, and the data ID F315, the scope of applying an authority transfer narrows. When a user enters an indefinite value, such as a null value, for example, in each of the function F312, the device ID F313, the BOX ID F314, and the data ID F315 in a reverse order, the scope of applying an authority transfer increases.

For example, when an ID is entered in each of the device ID F313 and the BOX ID F314 and a null value is entered in the data ID F315, an authority transfer applies to all image data stored in each of the BOXes identified with the BOX ID 314. Each of the identifiers (values) stored in and managed by the table F310 is a value effective in each of the apparatuses and devices in the information processing system illustrated in FIG. 1.

Figure 4:
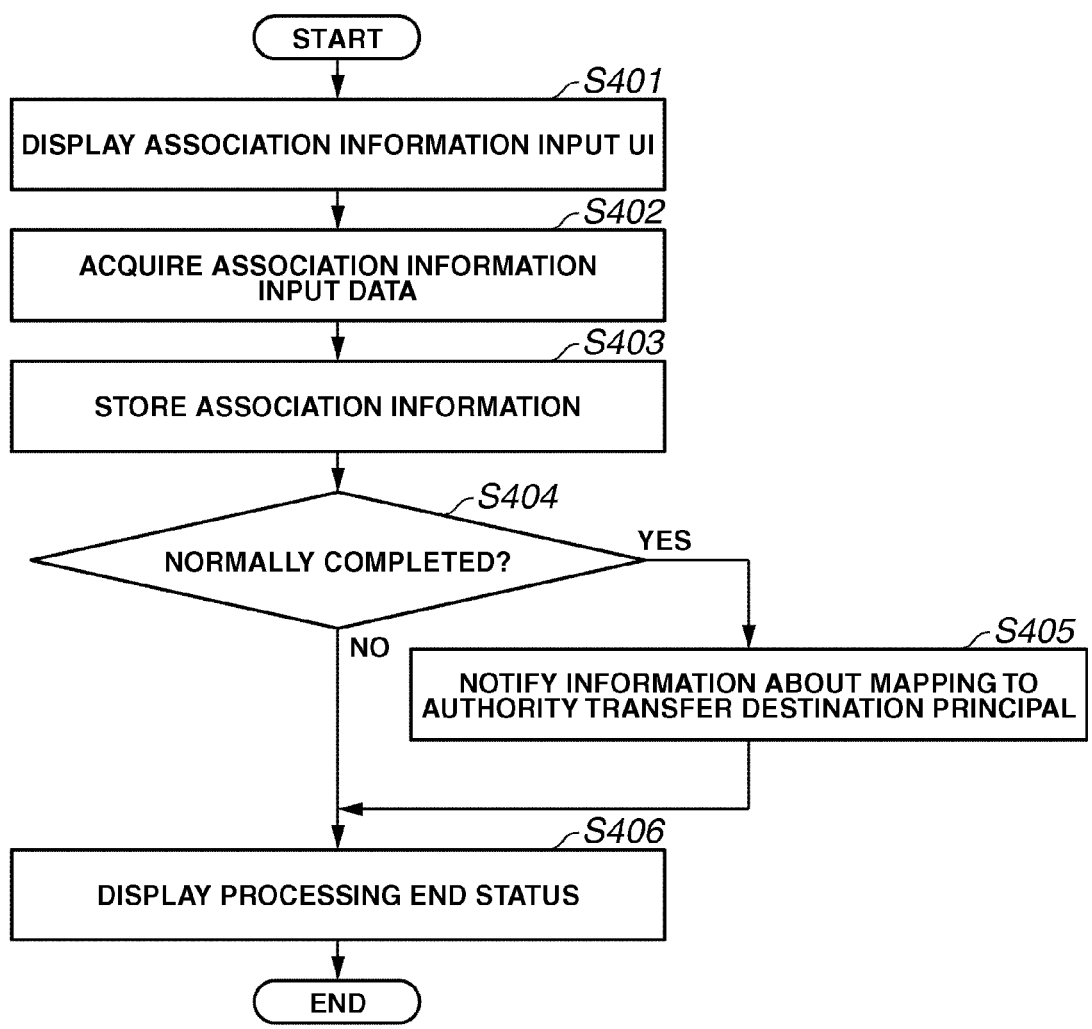
FIG. 4 is a flow chart illustrating processing for generating the association information requested from an authority transfer source principal according to an exemplary embodiment of the present invention.
Figure 5:
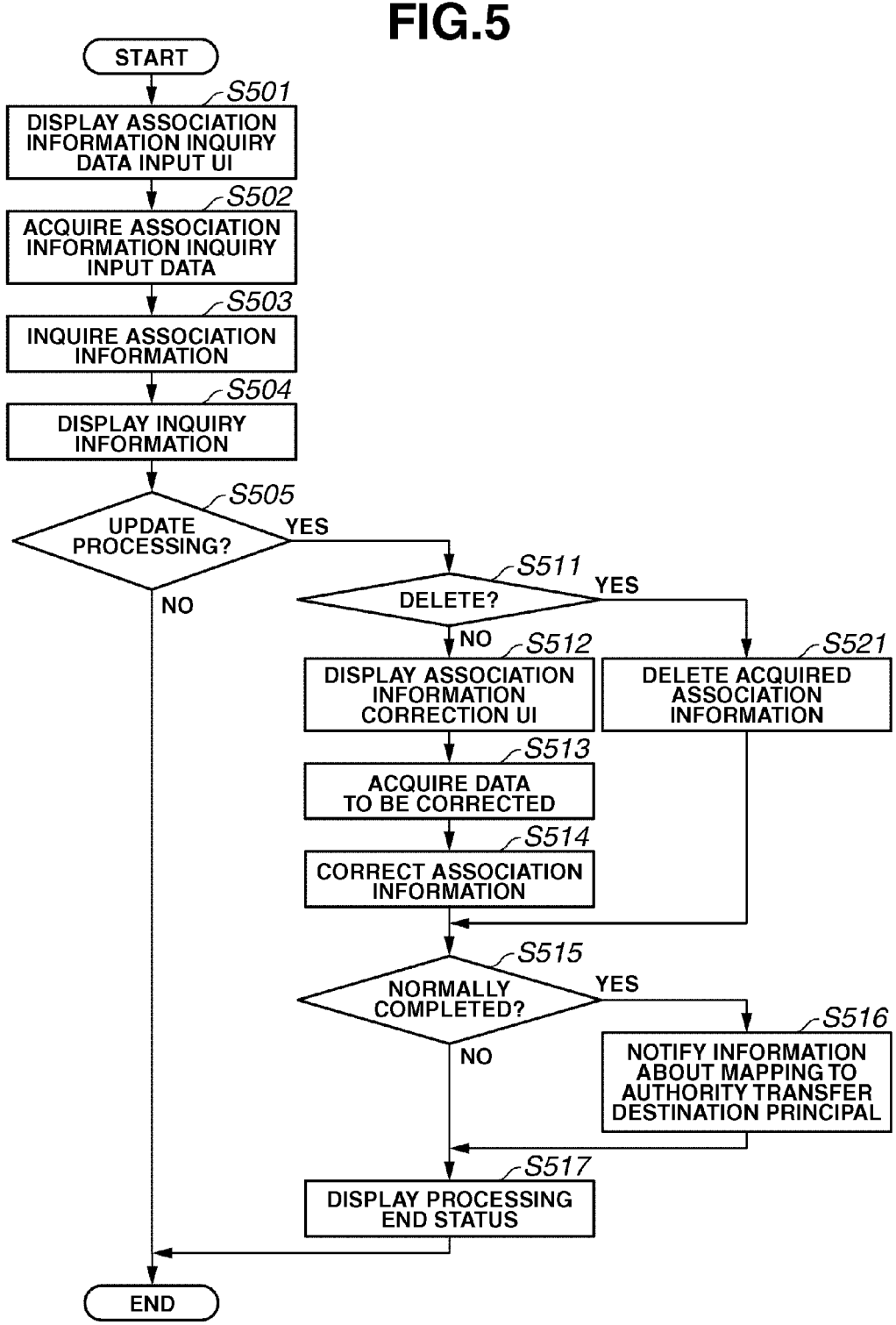
FIG. 5 is a flow chart illustrating processing for inquiring, updating, and deleting the association information performed by a principal according to an exemplary embodiment of the present invention.

FIG. 4 and FIG. 5 each illustrate an exemplary flow of processing for managing association information for an authority of a principal. FIG. 4 is a flow chart illustrating processing for generating the association information requested from a user. FIG. 5 is a flow chart illustrating processing for inquiring, updating, and deleting the association information. The processing illustrated in each of FIG. 4 and FIG. 5 is performed by the CPU 201 according to a program previously stored on the ROM 202 or the HDD 210 of the mapping information management apparatus 100.

The association information is generated by an authority transfer source principal according to the processing illustrated in FIG. 4.

Referring to FIG. 4, in step S401, the CPU 201 displays a user interface prompting a user to enter data in each data item constituting the association information illustrated in FIG. 3. The processing in step S401 is performed with the user interface display unit 104 illustrated in FIG. 1.

An output of the processing in step S401 can be displayed on the display 208 (FIG. 2) by the display controller 207 (FIG. 2). Alternatively, the output can be transmitted to the information processing terminal 110, for example, via the communication unit 105 (FIG. 1).

In step S402, the association information updating unit 101 illustrated in FIG. 1 acquires the association information entered by the user via the user interface display unit 104. In step S403, the CPU 201 stores the entered association information in the association information storage unit 103.

In step S404, the association information updating unit 101 estimates an end status related to the storage of the association information in the association information storage unit 103. In addition, in step S404, the association information updating unit 101 determines whether the newly generated association information is appropriate.

More specifically, the association information updating unit 101 determines whether the content of each of the function F312, the BOX ID F314, and the data ID F315 can be processed with an authority of the authority transfer source principal.

If, as a result of the determination in step S404, it is determined that the content of each of the function F312, the BOX ID F314, and the data ID F315 can be processed with an authority of the authority transfer source principal, then the association information updating unit 101 determines that the association information is appropriate.

On the other hand, if, as a result of the determination in step S404, it is determined that the content of each of the function F312, the BOX ID F314, and the data ID F315 cannot be processed with an authority of the authority transfer source principal, then the association information updating unit 101 determines that the association information is not appropriate. Thus, the transfer of an authority for the processing that the authority transfer source principal is not authorized to perform can be prevented.

If the processing is determined to be normally completed, that is, if it is determined in step S404 that the association information is appropriate, (YES in step S404), then the CPU 201 advances to step S405. In step S405, the association information updating unit 101 sends a notification to a principal identified with the authority transfer destination principal ID T303 (FIG. 3) via the communication unit 105, as illustrated in an example in FIG. 7. In the present embodiment, the notification is sent via e-mail. The notification method is not limited to e-mail, and any other notification method that would enable practice of the present invention is applicable.

In this case, at the time the association information is entered, information about a notification destination is entered by the user entering the association information.

In step S406, the user interface display unit 104 displays a processing end status on the user interface. Then, the CPU 201 ends the processing.

Processing for inquiring, updating, and deleting the association information, performed by the mapping information management apparatus 100 according to a request from a principal, is performed as illustrated in FIG. 5.

The flow of processing illustrated in FIG. 5 mainly includes three processing operations, namely, inquiry for the association information, correction of the association information, and deletion of the association information. In this regard, in performing the correction processing and the deletion processing, it is necessary to previously identify (inquire) the association information to be corrected or deleted.

The inquiry processing will be described first, and then the correction processing and the deletion processing will be described.

Referring to FIG. 5, in the processing for inquiring the association information, in step S501, the CPU 201 displays a user interface for prompting the user to enter a value that is a condition for the association information to be inquired. More specifically, the CPU 201 prompts the user to enter the authority transfer source principal ID T301 and/or the authority transfer destination principal ID T303. In the processing in step S501, a displaying method similar to that used in step S401 in the flow chart of FIG. 4 can be used.

In step S502, the association information inquiry unit 102 illustrated in FIG. 1 acquires the value that is the condition for the inquiry of the association information entered via the user interface display unit 104. In step S503, the association information inquiry unit 102 inquires the association information stored in the association information storage unit 103. In step S504, the user interface display unit 104 displays the inquired association information by a method similar to that in step S501.

Now, the processing for correcting and deleting the association information will be described.

In step S505, the user interface display unit 104 generates an inquiry as to whether the information identified in the above-described association information inquiry processing is to be updated. If it is determined in step S505 that the identified association information is to be updated (YES in step S505), then the CPU 201 advances to step S511. In step S511, the CPU 201 inquires whether the updating processing is to be performed by correcting the association information or by deleting the association information.

With respect to the above-described branching processing (step S505 and step S511), the user can generate an instruction for branching the processing in step S504. Alternatively, another user interface can be displayed to allow the user to generate an instruction for branching the processing. If the user generates an instruction for deleting the association information in the branching processing in step S511, that is, if it is determined that the association information is to be deleted, (YES in step S511), then the CPU 201 advances to step S521. In step S521, the CPU 201 deletes the association information with the association information updating unit 101.

On the other hand, if the user does not generate an instruction for deleting the association information, that is, if it is determined that the user generates an instruction for correcting the association information, (NO in step S511), then the CPU 201 advances to step S512. In step S512, the CPU 201 stores the association information acquired in the above-described inquiry processing in the field in which the association information can be corrected and displays the association information via the user interface display unit 104.

In step S513, the association information updating unit 101 acquires the association information corrected via the user interface display unit 104. In step S514, the CPU 201 corrects the association information with the association information storage unit 103 according to the corrected data.

In step S515, the CPU 201, with respect to the deletion processing in step S521 and the correction processing in step S514, estimates an end status related to updating in the association information storage unit 103. If it is determined in step S515 that the processing is normally completed (YES in step S515), then the CPU 201 advances to step S516. In step S516, the CPU 201 performs processing similar to the processing for notifying the principal in step S405 illustrated in FIG. 4.

The processing in step S515 is similar to the processing in step S404 illustrated in the flow chart of FIG. 4. That is, in step S515, the CPU 201 determines whether the updated association information is appropriate. In step S517, the user interface display unit 104 displays a processing end status on the user interface. Then, the CPU 201 ends the inquiry processing and the updating processing.

An example of substitute print processing performed by the image forming apparatus 130 responsive to an authority transfer will now be described.

Figure 6:
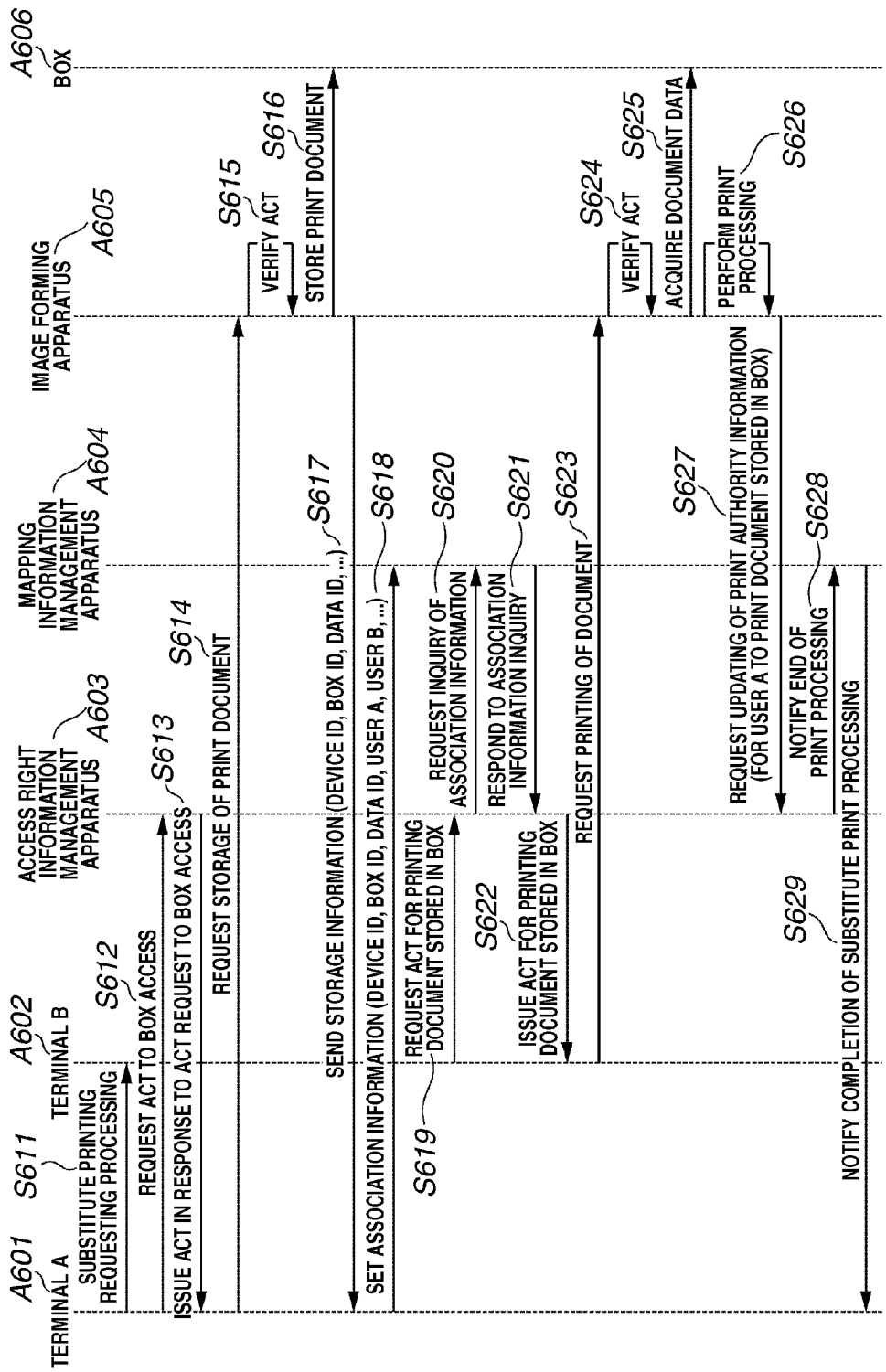
FIG. 6 illustrates a sequence for substitute processing performed by a user B for a user A according to an exemplary embodiment of the present invention.

FIG. 6 illustrates an exemplary sequence for substitute processing performed by the user B for the user A. In the example illustrated in FIG. 6, the user A stores a document in a BOX in the image forming apparatus 130. Then, the user A transfers an authority to the user B.

Referring to FIG. 6, a terminal A (A601) and a terminal B (A602) are information processing terminals 110 used by the user A and the user B, respectively. Both user A and user B are users of the system. The access right information management apparatus 120 (FIG. 1) manages the access rights of the users A and B with respect to the image forming apparatus 130.

An access right information management apparatus A 603 corresponds to the access right information management apparatus 120 illustrated in FIG. 1. In the present embodiment, the access right information management apparatus A 603 not only manages access right information for the principal, but also an access control ticket (ACT), which corresponds to the control information illustrated in FIG. 10.

A mapping information management apparatus A604 corresponds to the mapping information management apparatus 100 illustrated in FIG. 1. The mapping information management apparatus A604 manages association information for an authority transfer source principal ID and an authority transfer source principal ID with respect to the processing performed by the image forming apparatus 130 using the table illustrated in FIG. 3.

An image forming apparatus A605 corresponds to the image forming apparatus 130 illustrated in FIG. 1. The image forming apparatus A605 interprets the ACT acquired from the access right information management apparatus A603 according to a request for performing processing from a principal and provides a function within a range described in the acquired ACT to the principal. A BOX A606 is a storage area that can store image data managed for each image forming apparatus.

The sequence illustrated in FIG. 6 will be described below.

In step S611, the user A requests the user B to perform substitute printing. After the user B has approved performing the substitute printing, the user A stores a document to be printed into the BOX A606 managed by the image forming apparatus A605.

As described above, the substitute processing performed with the image forming apparatus A605 is controlled with an ACT generated by the access right information management apparatus A603. Accordingly, in step S612, the terminal A (A601) requests the access right information management apparatus A603 to generate an ACT for the image forming apparatus A605.

In step S613, the access right information management apparatus A603 generates an ACT to the terminal A (A601) in response to the request from the terminal A (A601).

The access right information management apparatus A603, at the time of generating an ACT, generates a request for inquiring the association information for the user A to the mapping information management apparatus A604. In the present embodiment, it is assumed that no association information is stored related to the processing. Accordingly, the inquiry processing as to the association information for the user A is not illustrated in FIG. 6.

The processing related to the association information such as the inquiry processing will be described below.

In step S614, the terminal A (A601) sends the ACT received from the access right information management apparatus A603 to the image forming apparatus A605 and requests storage of the document to be printed (print document) in the BOX A606.

In step S615, the image forming apparatus A605 checks whether the user A has an appropriate authority according to the ACT sent from the terminal A (A601). In step S616, the image forming apparatus A605 stores the print document in the BOX A606. In step S617, the image forming apparatus A605 sends a reply to the request. Here, the image forming apparatus A605 sends a processing ID, a function ID, a device ID, a BOX ID, and a data ID in response to the request.

Then, the user A performs a setting for transferring an authority to print the document to the user B. Here, the user A performs processing similar to the processing illustrated in FIG. 4.

The user A enters an the authority transfer source principal ID, a processing ID, an authority transfer destination principal ID, an expiration date, information indicating the presence or absence of a deletion flag, a function ID, a device ID, a BOX ID, and a data ID, which are entered via the terminal A (A601).

The information notified from the image forming apparatus A605 in step S617 is used as the processing ID, the function ID, the device ID, the BOX ID, and the data ID.

Then, in step S618, the user A sends the entered information from the information processing terminal 110 (A601) to the mapping information management apparatus A604.

With respect to the setting by the user, the user A can enter the setting via the user interface displayed by the user interface display unit 104 of the mapping information management apparatus A604.

Thus, in the mapping information management apparatus A604, the association information is set in the table illustrated in FIG. 3. The content of the setting performed with the mapping information management apparatus A604 is sent, via e-mail for example, to the terminal B (A602).

Then, substitute print processing by the user B using the transferred authority is subsequently performed. The user B operates the terminal B (A602). In step S619, the terminal B (A602) requests the access right information management apparatus A603 to generate an ACT for the user B concerning the image forming apparatus A605.

In step S620, the access right information management apparatus A603 inquires the mapping information management apparatus A604 about the association information for the user B for the processing by the image forming apparatus A605, according to the request from the terminal B (A602).

Then, the mapping information management apparatus A604 refers to the table T300 and the table F310 illustrated in FIG. 3 to search for the association information matching the information that the access right information management apparatus A603 has received from the terminal B (A602).

As a result, the association information set in step S618 is searched. In step S621, the mapping information management apparatus A604 sends the search result to the access right information management apparatus A603 as a reply to the request.

The access right information management apparatus A603, after receiving the association information from the mapping information management apparatus A604, acquires only a processing content described in the received association information of the access right information concerning the user B.

In step S622, the access right information management apparatus A603 applies, to the acquired access right information, the access right information for the principal (here, the user A) described in the authority transfer source principal ID T301 in FIG. 3 to generate an ACT to the terminal B (A602).

The ACT thus generated has a content reflecting restriction to use the image forming apparatus A605, which is defined by the association information. The use restriction defined by the association information includes the expiration date in the association information, for example.

If, at this time, no principal information for the user B exists under management by the access right information management apparatus A603, the access right information management apparatus A603 can nullify the ACT generation processing itself and send error code. Alternatively, the access right information management apparatus A603 can generate an ACT according only to the access right information for the user B.

In step S623, the terminal B (A602), after having received the ACT from the access right information management apparatus A603, sends the ACT to the image forming apparatus A605 to request processing for printing the document.

In step S624, the image forming apparatus A605 checks whether the user B has an authority to perform the requested operation according to the ACT, as in the processing in step S615. In steps S625 and S626, the image forming apparatus A605 prints the document data stored in the BOX A606.

At this time, the image forming apparatus A605 prints the document according to the content of the ACT reflecting the association information.

For example, if updating processing for nullifying the association information has been performed due to lapse of the expiration date in the association information (i.e., when the deletion flag T305 is set to "TRUE"), the content inhibiting the use of the image forming apparatus A605 is reflected to the ACT. In this case, the image forming apparatus A605 receives the ACT but does not perform printing.

After having performed the requested processing, in step S627, the image forming apparatus A605 notifies the access right information management apparatus A603 that the requested processing has been completed and sends arbitrary information as necessary. The information sent can be the information to be updated (overwritten) by the processing with the data managed by the access right information management apparatus A603, such as information about the number of paper sheets output by the printing.

In step S628, after receiving the notification of completion of the processing from the image forming apparatus A605, the access right information management apparatus A603 also notifies the completion of the processing to the mapping information management apparatus A604. In step S629, after receiving the notification of completion of the processing, the mapping information management apparatus A604 notifies the terminal A (A601) that the processing performed according to the transferred authority has been normally completed.

With respect to the above-described processing performed in steps S628 and S629, an item indicating information about the number of times of authorized print operations can be provided in the table T300 illustrated in FIG. 3. That is, the configuration of the present embodiment can be arranged such that the number of times of authorized operations for printing the data indicated in the table T300 is decremented by one at the time of performing the processing in step S628. When the number of times of authorized print operations is decremented to zero, the deletion flag T305 is updated to "TRUE".

For example, when the number of times of authorized print operations is set to "1", the authority transfer destination principal can no longer perform the once-performed processing.

By setting an upper limit value for the number of times of authorized processing operations, an authority transfer destination principal cannot freely perform the transferred processing a desired number of times. Thus, the security in the case where an authority is transferred can be improved.

In addition, by adding to the table an item indicating an e-mail address of the user transferring his authority, flexible implementation can be realized such that when the processing is completed or when the deletion flag T305 is updated, an e-mail indicating so is sent to the set e-mail address.

In the example illustrated in FIG. 6, the terminal B (A602) generates a request for printing a document stored in the BOX A606. Alternatively, the image forming apparatus A605 can generate a request for printing a document stored in the BOX A606 according to an operation on the image forming apparatus A605 by the user B.

In this case, in step S619, the image forming apparatus A605 sends the request to the access right information management apparatus A603.

Furthermore, in step S622, the access right information management apparatus A603 sends an ACT to the image forming apparatus A605.

Moreover, in step S623, the user B operates the image forming apparatus A605 to generate an instruction for printing the document stored in the BOX A606.

Figure 8:
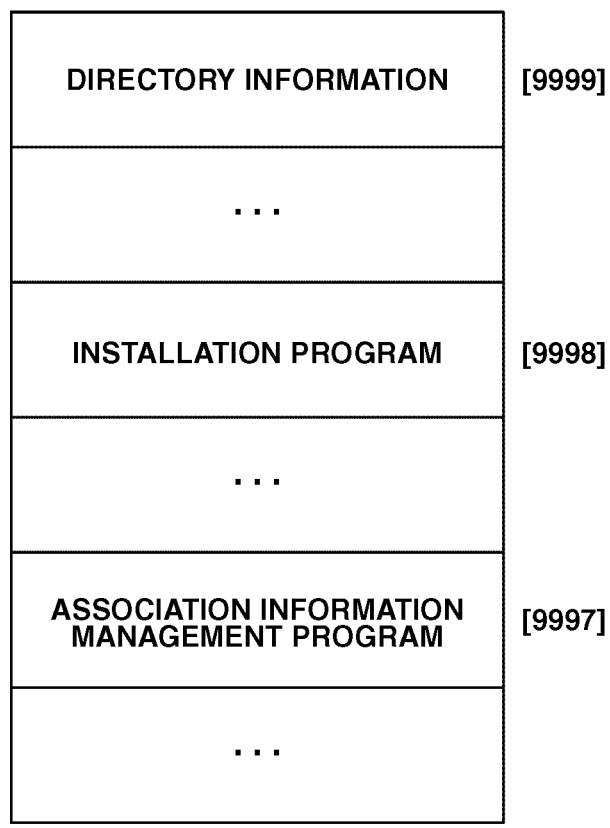
FIG. 8 illustrates a memory map of a compact disk-read-only memory (CD-ROM), which is an example of a storage medium according to an exemplary embodiment of the present invention.

FIG. 8 illustrates a memory map of a CD-ROM, which is an example of a storage medium according to the present embodiment.

Referring to FIG. 8, in a storage area 9999, directory information is stored. The directory information stored in the storage area 9999 indicates information about positions of subsequent storage areas 9998 and 9997.

In the storage area 9998, an installation program is stored. In the storage area 9997, a program for managing association information for the information processing apparatus 200 is stored.

In installing on the information processing apparatus 200 the association information management program for the information processing apparatus 200, first, the installation program stored in the storage area 9998 is loaded on the ROM 202 or the HDD 210 of the system to be executed by the CPU 201.

Then, the installation program executed by the CPU 201 reads the association information management program for the information processing apparatus 200 from the storage area 9997 to overwrite the data stored on the ROM 202 with the read program or to install the read program on the HDD 210. In this case, it is required that the ROM 202 is a rewritable ROM, such as a Flash ROM, not a simple mask ROM.

As described above, according to the present embodiment, the association information to be reflected to an ACT can be appropriately updated as necessary. Thus, restriction on using an image forming apparatus with respect to an already-generated job can be changed at an arbitrary timing.

For example, as descried above, by properly setting the range of restriction on the processing performed with the image forming apparatus or by appropriately inhibiting the use of the image forming apparatus, an access to data from an authority transfer destination principal, which is not desired or allowed by an administrator of the system and could cause distribution of the data, can be prevented.

As described above, in the present embodiment, granularity designated for processing information, i.e., range of restriction on performing processing, in association information can be changed. Furthermore, information indicating an expiration date in the association information or information indicating the number of times of authorized processing operations (applications) is added to the association information.

Accordingly, the degree of freedom of utilizing an authority transferred to an authority transfer destination principal can be either increased or decreased. By controlling the utilization of a transferred authority, the risk of improper or falsified utilization of an authority can be reduced.

In addition, the management and control of the authority is performed not beyond a control boundary set according to centrally-managed principal authorities. Accordingly, even in the case of a change in or nullification of the transferred authority, for example due to a change in office of or retirement of the principal who has transferred his authority, the transferred authority can be managed and controlled while reflecting the content of the change or nullification at an appropriate timing.

Moreover, with respect to a destination of adding an amount of use, such as charging information, a restriction of use can be applied by adding information related to the amount of use to the association information, which implements more flexible control.

Moreover, the present invention can be applied to a system or an integrated apparatus including a plurality of devices, for example, a computer, an interface device, and a reader, and to an apparatus that includes a single device.

Furthermore, the present invention can also be achieved by providing a system or a device with a storage medium (or a recording medium) which stores program code of software implementing the functions of the exemplary embodiments and by reading and executing the program code stored in the storage medium with a computer of the system or the device (a CPU or an MPU).

In this case, the program code itself, which is read from the storage medium, implements the functions of the exemplary embodiments described above, and accordingly, the storage medium storing the program code constitutes the present invention.

As the storage medium for supplying such program code, a floppy disk, a hard disk, an optical disk, a magneto-optical disk (MO), a CD-ROM, a CD-recordable (CD-R), a magnetic tape, a nonvolatile memory card, and a ROM, for example, can be used.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-206981 filed Jul. 28, 2006 and No. 2007-133406 filed May 18, 2007, which are hereby incorporated by reference herein in their entirety.

What is claimed is:

1. An authority management apparatus configured to communicate with an external multifunction peripheral comprising:

at least one microprocessor coupled via a bus to a memory, the microprocessor being programmed to control one or more of:

a management unit configured to manage authority information indicating an authority concerning use of a plurality of functions of the external multifunction peripheral with respect to each of a first user and a second user different from the first user, wherein the external multifunction peripheral includes a scanner for reading a document and a printer for printing an image, and the plurality of functions of the external multifunction peripheral includes a scanning function and a printing function;

a determination unit configured to determine whether the first user has an authority of permission information for permitting the second user to use a function of the external multifunction peripheral, the permission information indicating an authority transferred from the first user to the second user;

an updating unit configured to update, by applying the permission information to the authority information concerning the second user, the authority information concerning the second user, in a case where the determination unit determines that the first user has the authority of the permission information; and a sending unit configured to send the updated authority information updated by the updating unit to the external apparatus according to a request transmitted from the external apparatus operated by the second user.

2. The authority management apparatus according to claim 1, wherein the updating unit is configured to update the authority information concerning the second user according to the permission information based on receiving from an external source, information indicating a request for permitting the second user to use the external multifunction peripheral.

3. The authority management apparatus according to claim 1, wherein the authority management apparatus communicates with a permission information management apparatus that provides the permission information to the authority management apparatus, and
wherein the updating unit is configured to update the authority information concerning the second user based on the permission information received from the permission information management apparatus.

4. The authority management apparatus according to claim 1, further comprising a permission information management unit configured to manage the permission information.

5. The authority management apparatus according to claim 1, wherein the permission information includes information for identifying the first user, information for identifying the second user, and information about a function of the external multifunction peripheral permitted to be used by the second user.

6. The authority management apparatus according to claim 5, wherein the permission information further includes information indicating a specific storage area in a storage device of the external apparatus and/or specific data stored in the storage device, the information being used along with the function of the external multifunction peripheral permitted to be used by the second user.

7. The authority management apparatus according to claim 1, wherein the permission information includes information indicating an expiration date of permission for the second user to use a function of the external multifunction peripheral executable by the first user.

8. The authority management apparatus according to claim 1, wherein the permission information includes information indicating a number of permitted times the second user can use a function of the external multifunction peripheral executable by the first user.

9. An authority management system comprising:
an authority management apparatus;
an external apparatus; and
an external multifunction peripheral which includes a scanner for reading a document and a printer for printing an image and has a plurality of functions including a scanning function and a printing function,
wherein the authority management apparatus comprises:
at least one hardware microprocessor coupled via a bus to a memory, the processor being programmed to control one or more of:
a management unit configured to manage authority information indicating an authority concerning use of the plurality of functions of the external multifunction peripheral apparatus with respect to each of a first user and a second user different from the first user;
a determination unit configured to determine whether the first user has an authority of permission information for permitting the second user to use a function of the external image forming apparatus, the permission information indicating an authority transferred from the first user to the second user;
an updating unit configured to update, by applying the permission information to the authority information concerning the second user, the authority information concerning the second user, in a case where the determination unit determines that the first user has the authority of the permission information, and
a sending unit configured to send the updated authority information updated by the updating unit to an external apparatus according to a request transmitted from the external apparatus operated by the second user,
wherein the function of the external multifunction peripheral includes at least two of a copy function, print function, image sending function, or image storage function, and
wherein the external multifunction peripheral is configured to restrict use of the external multifunction peripheral by the second user based on the updated authority information sent by the sending unit.

10. A method in an authority management apparatus configured to communicate with an external multifunction peripheral, the method comprising:
managing authority information indicating an authority concerning use of a plurality of functions of the external multifunction peripheral with respect to each of a first user and a second user; wherein the external multifunction peripheral includes a scanner for reading a document and a printer for printing an image, and the plurality of functions of the external multifunction peripheral includes a scanning function and a printing function;
determining whether the first user has an authority of permission information for permitting the second user to use a function of the external multifunction peripheral, the permission information indicating an authority transferred from the first user to the second user;
updating the authority information concerning the second user by applying the permission information to the authority information concerning the second user, in a case where it is determined that the first user has the authority of the permission information; and
sending the updated authority information to the external apparatus operated by the second user according to a request transmitted from the external apparatus.

11. A computer-readable non-transitory storage medium storing computer-executable process steps, the computer-executable process steps causing a computer to execute the method of claim 10.

* * * * *